United States Patent
Lee et al.

(10) Patent No.: US 10,725,219 B2
(45) Date of Patent: Jul. 28, 2020

(54) MANUFACTURING METHOD OF OPTICAL FILM AND OPTICAL FILM

(71) Applicant: LG CHEM, LTD., Seoul (KR)

(72) Inventors: Beom Seok Lee, Daejeon (KR); Suk Jae Lee, Daejeon (KR); Kyung Hyeok Park, Daejeon (KR); San Park, Daejeon (KR); Hang Suk Choi, Daejeon (KR); Eung Jin Jang, Daejeon (KR); Bong Su Jeung, Daejeon (KR); Jea Han Ryoo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 296 days.

(21) Appl. No.: 15/603,902

(22) Filed: May 24, 2017

(65) Prior Publication Data
US 2017/0343714 A1    Nov. 30, 2017

(30) Foreign Application Priority Data
May 31, 2016    (KR) .......................... 10-2016-0067643

(51) Int. Cl.
| | |
|---|---|
| G02B 5/00 | (2006.01) |
| B32B 7/00 | (2019.01) |
| B32B 37/00 | (2006.01) |
| B32B 38/00 | (2006.01) |
| G02B 5/30 | (2006.01) |
| B32B 7/12 | (2006.01) |
| B32B 37/26 | (2006.01) |
| B32B 37/12 | (2006.01) |

(52) U.S. Cl.
CPC .............. *G02B 5/3033* (2013.01); *B32B 7/12* (2013.01); *B32B 37/26* (2013.01); *B32B 38/0004* (2013.01); *B32B 37/12* (2013.01); *B32B 2037/268* (2013.01); *B32B 2307/40* (2013.01); *B32B 2457/20* (2013.01); *Y10T 156/1079* (2015.01)

(58) Field of Classification Search
None
See application file for complete search history.

(56) References Cited

U.S. PATENT DOCUMENTS

| | | | | |
|---|---|---|---|---|
| 3,727,856 A | * | 4/1973 | Kitch ................... | B65H 23/005 242/413.2 |
| 5,221,982 A | | 6/1993 | Faris | |
| 8,083,886 B2 | * | 12/2011 | Kumagai ........... | B29D 11/0073 156/265 |

FOREIGN PATENT DOCUMENTS

KR    10-1173356 B1    8/2012

* cited by examiner

*Primary Examiner* — Linda L Gray
(74) *Attorney, Agent, or Firm* — Dentons US LLP

(57) ABSTRACT

Provided is a method for an optical film which elongates by forming a plurality of sheet pieces by cutting a pre-processing optical film in a width direction of the pre-processing optical film, aligning the plurality of sheet pieces in such a manner that first end portions parallel to the longitudinal direction of the pre-processing optical film are opposite to each other, and connecting end portions of the plurality of sheet pieces to each other.

9 Claims, 9 Drawing Sheets

MANUFACTURING METHOD OF OPTICAL FILM AND OPTICAL FILM

CROSS-REFERENCE TO RELATED APPLICATIONS

This application claims priority from Korean Patent Application No. 10-2016-0067643 filed on May 31, 2016, the disclosure of which is incorporated by reference in its entirety, as if fully set forth herein.

TECHNICAL FIELD

The present invention relates to a manufacturing method of an optical film and the optical film, and more particularly, to an optical film having an absorption axis orthogonal to the longitudinal direction of the optical film and a manufacturing method of the optical film, which manufactures the same.

BACKGROUND ART

Display units including a liquid crystal display (LCD), organic light emitting diodes (OLED), a plasma display panel (PDP), an electrophoretic display (EPD), and the like are manufactured through multiple processes. Among the manufacturing processes, in particular, a process of attaching an optical film onto a panel is provided. The optical film is attached onto one plane and the other plane of the panel, and when an absorption axis of the optical film attached onto one plane of the panel and the absorption axis of the optical film attached onto the other of the panel are vertical to each other, the panel normally operates. An optical film attaching system is required, which attaches the optical films having the vertical absorption axes on both planes of the panel by one process.

In the related art, an operation of the optical film attaching system is described below, which attaches the optical films having the vertical absorption axes on both planes of the panel by one process.

FIG. 1 is a top view of an optical film attaching system of a panel in the related art.

Referring to FIG. 1, in the optical film attaching system of the panel in the related art, when a roller R1 feeding an optical film F1 having a width corresponding to a short edge of a panel W feeds the optical film F1, an attachment unit 18 attaches the optical film F1 fed by the roller R1 onto one plane of the panel W while the panel W moves toward the short edge along feeding units 12, 14, and 16. Thereafter, a pivot unit 20 pivots the panel W at 90° in a horizontal direction and an inversion unit 21 inverts the panel W at 180° in a vertical direction. In addition, when a roller R2 feeding an optical film F2 having a width corresponding to a long edge of the panel W feeds the optical film F2, an attachment unit 28 attaches the optical film F2 fed by the roller R2 onto the other plane of the panel W while the panel W is pivoted and inverted to move toward the long edge. Thereafter, the panel W is fed by feeding units 22, 24, and 26. A panel substrate polarization film attaching system in the related art, which attaches polarization films onto both planes of the panel has the following problem.

When the size of the panel increases (for example, the size of a screen is 98 inches and hereinafter, referred to as a large-area panel), in the case where the optical film having the width corresponding to the long edge of the panel is fed through the roller, a phenomenon occurs, in which the roller droops down as the width of the roller increases. As a result, when the optical film is attached onto the panel, a failure factor occurs between the optical film and an attachment planes of the panel, and as a result, the quality of the display unit deteriorates.

Since the optical film attaching system of the panel in the related art uses the optical film having the absorption axis parallel to the longitudinal direction of the optical film, the problem occurs. Accordingly, when the optical film is used, which has the width corresponding to the short edge of the panel and has the absorption axis orthogonal to the longitudinal direction of the optical film, the problem may be resolved.

DETAILED DESCRIPTION OF THE INVENTION

Technical Problem

The present invention has been made in an effort to provide an optical film having an absorption axis orthogonal to the longitudinal direction of the optical film and a manufacturing method of the optical film, which manufactures the same.

Technical Solution

An exemplary embodiment of the present invention provides a method for an optical film, including: forming a plurality of sheet pieces by cutting a pre-processing optical film in which a release film, an adhesive layer, an optical member, and a surface protection film are sequentially stacked in a width direction of the pre-processing optical film; aligning the plurality of sheet pieces in such a manner that first end portions parallel to the longitudinal direction of the pre-processing optical film are opposite to each other, wherein each of sheet pieces has a first end portion and a second end portion, which are orthogonal to each other; and connecting the first end portions of the plurality of sheet pieces, which are opposite to each other, wherein an elongated post-processing optical film is manufactured.

The direction of the absorption axis formed in the optical member included in the post-processing optical film may be orthogonal to the longitudinal direction of the post-processing optical film.

In the connecting, the release films on two adjacent sheet pieces may be connected to each other by using a first connection member.

When adhesive force between the first connection member and the release film is represented by A and the adhesive force between the release film and the adhesive layer is represented by B, A may be larger than B.

In the connecting, the release films on two adjacent sheet pieces may be connected to each other by using the first connection member and the surface protection films on two adjacent sheet pieces may be connected to each other by using a second connection member.

When the adhesive force between the first connection member and the release film is represented by A, the adhesive force between the release film and the adhesive layer is represented by B, and the adhesive force between the second connection member and the surface protection film is represented by C, C may be equal to or larger than A and A may be larger than B.

The connection member may be attached to a first end-direction total length of the sheet piece parallel to the longitudinal direction of the pre-processing optical film.

An attachment velocity of the connection member to the sheet piece may be 2.0 to 8.0 m/min.

The manufacturing method of an optical film may further include winding the post-processing optical film in a roll type, in which in the winding, winding tension applied to the post-processing optical film may be in the range of 100 to 200 N/m.

Another exemplary embodiment of the present invention provides a post-processing optical film in which a plurality of sheet pieces are connected to each other, which is formed by cutting a pre-processing optical film in which a release film, an adhesive layer, an optical member, and a surface protection film are sequentially stacked in a width direction of the pre-processing optical film, in which the plurality of sheet pieces is aligned in such a manner that first end portions parallel to the longitudinal direction of the pre-processing optical film are opposite to each other, and the first end portions of the plurality of sheet pieces, which are opposite to each other are connected to each other to obtain the post-processing optical film, wherein a first end portion and a second end portion, which are orthogonal to each other.

The direction of the absorption axis formed in the optical member included in the post-processing optical film may be orthogonal to the longitudinal direction of the post-processing optical film.

The release films on two adjacent sheet pieces may be connected to each other by a first connection member.

When the adhesive force between the first connection member and the release film is represented by A and the adhesive force between the release film and the adhesive layer is represented by B, A may be larger than B.

The release films on two adjacent sheet pieces may be connected to each other by the first connection member and the surface protection films on two adjacent sheet pieces may be connected to each other by a second connection member.

When the adhesive force between the first connection member and the release film is represented by A, the adhesive force between the release film and the adhesive layer is represented by B, and the adhesive force between the second connection member and the surface protection film is represented by C, C may be equal to or larger than A and A may be larger than B.

The connection member may be attached to a first end-direction total length of the sheet piece parallel to the longitudinal direction of the pre-processing optical film.

Advantageous Effects

By a manufacturing method of an optical film according to an exemplary embodiment of the present invention, it is possible to easily and conveniently manufacture an optical film having an absorption axis orthogonal to the longitudinal direction of the optical film.

When an optical film according to another exemplary embodiment of the present invention is used, it is possible to easily manufacture a display unit using a large-area panel.

EXPLANATION OF REFERENCE NUMERALS AND SYMBOLS

Figure 1:
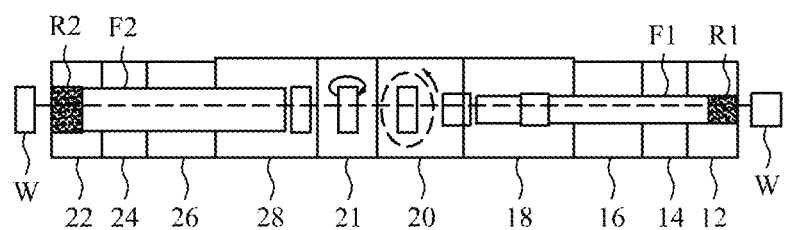
FIG. 1 is a top view of an optical film attaching system of a panel in the related art.

100: Pre-processing optical film
110: Release film
120: Adhesive layer
130: Optical member
140: Surface protection film
150: Adhesive
200: Sheet piece
300: Connection member
310: First connection member
320: Second connection member

BEST MODE

Hereinafter, exemplary embodiments of the present invention will be described in detail so as to be easily implemented by those skilled in the art, with reference to the accompanying drawings. However, the present invention can be realized in various different forms, and is not limited to the exemplary embodiments described herein. In addition, a part not related with a description is omitted in order to clearly describe the present invention in the drawings and throughout the specification, like reference numerals designate like elements.

Terms used in the present specification will be described in brief and the present invention will be described in detail.

Terms used in the present invention adopt general terms which are currently widely used as possible by considering functions in the present invention, but the terms may be changed depending on an intention of those skilled in the art, a precedent, and emergence of new technology. Further, in a specific case, a term which an applicant arbitrarily selects is present and in this case, a meaning of the term will be disclosed in detail in a corresponding description part of the invention. Accordingly, a term used in the present invention should be defined based on not just a name of the term but a meaning of the term and contents throughout the present invention.

Throughout the specification, unless explicitly described to the contrary, the word "comprise" and variations such as "comprises" or "comprising" will be understood to imply the inclusion of stated elements but not the exclusion of any other elements.

Hereinafter, the present invention will be described in detail with reference to the accompanying drawings.

Figure 2:
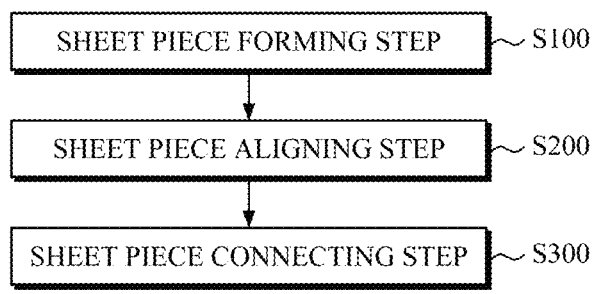
FIG. 2 is a flowchart illustrating a manufacturing method of an optical film according to an exemplary embodiment of the present invention.
Figure 3A:
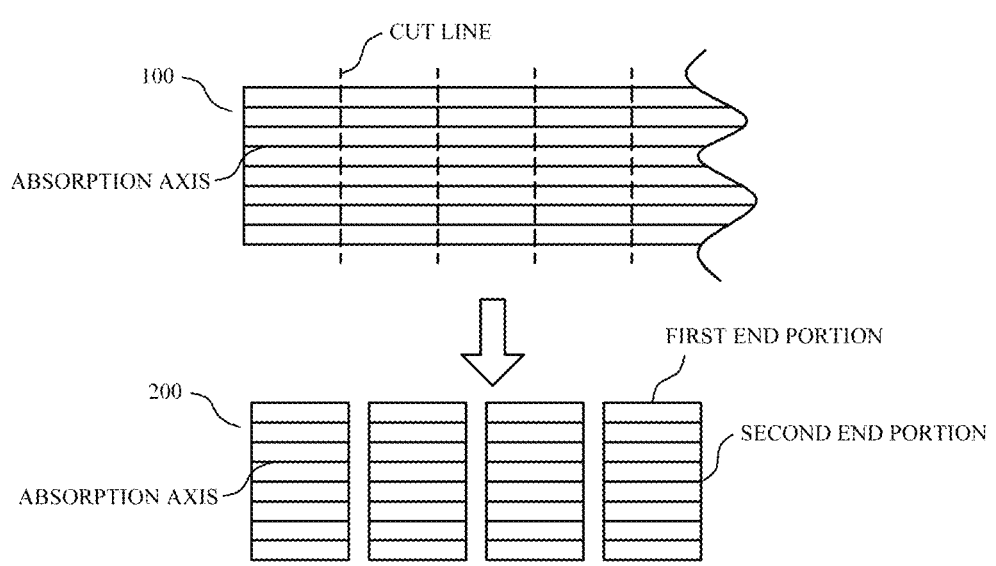
FIGS. 3a and 3b are diagrams illustrating that a post-processing optical film is manufactured by using a pre-processing optical film according to an exemplary embodiment of the present invention.
Figure 3B:
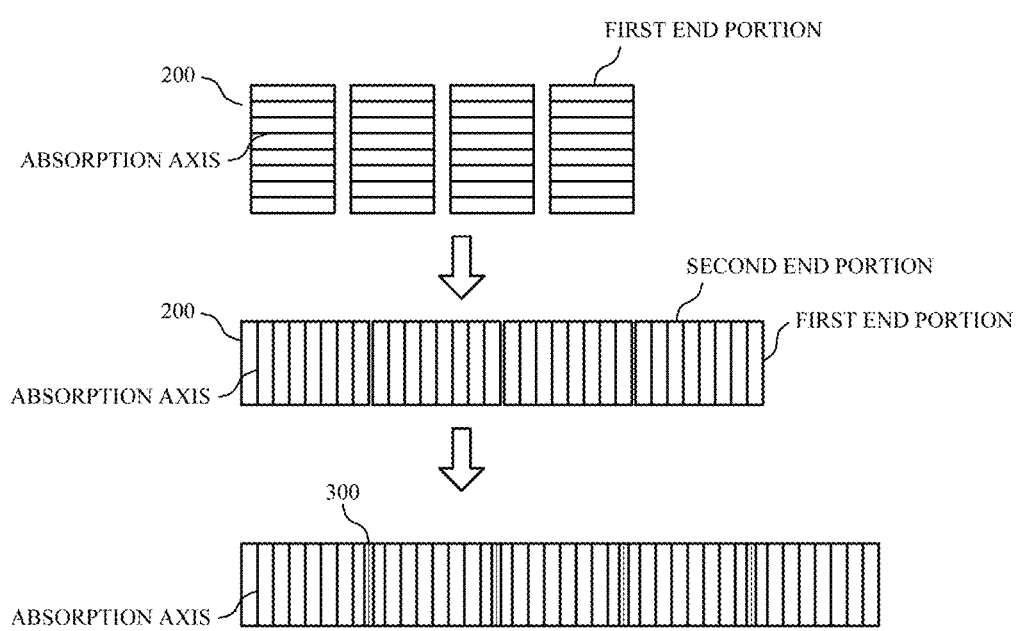

FIG. 2 is a flowchart illustrating a manufacturing method of an optical film according to an exemplary embodiment of the present invention and FIGS. 3a and 3b are diagrams illustrating that a post-processing optical film is manufactured by using a pre-processing optical film according to an exemplary embodiment of the present invention.

According to the exemplary embodiment of the present invention, provided is a manufacturing method of an optical film, which manufactures an elongated post-processing optical film, the method including a sheet piece forming step of forming a plurality of sheet pieces 200 by cutting a pre-processing optical film 100 in which a release film 110, an adhesive layer 120, an optical member 130, and a surface protection film 140 are sequentially stacked in a width direction of the pre-processing optical film 100, a sheet piece aligning step of aligning the plurality of sheet pieces 200 so that first end portions parallel to the longitudinal direction of the pre-processing optical film 100 between first end portions and second end portions of the sheet piece, which are orthogonal to each other are opposite to each other, and a sheet piece connecting step of connecting the first end portions of the plurality of sheet pieces 200, which are opposite to each other.

By the manufacturing method of an optical film according to the exemplary embodiment of the present invention, it is possible to easily and conveniently manufacture an optical film having an absorption axis orthogonal to the longitudinal direction of the optical film.

In the pre-processing optical film 100, the release film 110, the adhesive layer 120, the optical member 130, and the surface protection film 140 are sequentially stacked. The optical member 130 and the surface protection film 140 are attached to each other through an adhesive 150.

The optical member 130 may be formed by stacking a polarization film and a film having an optical characteristic. As the film having the optical characteristic, for example, a retardation film, a luminance enhancement film, a light diffusion film, and the like may be used. Further, the optical member 130 may be formed by stacking various films in addition to the film having the optical characteristic. The thickness of the optical member 130 varies depending on a configuration thereof, but the optical member 130 may have a thickness of, for example, 5 to 500 µm.

The polarization film may have a polarizer of, for example, an extended dyed polyvinyl alcohol film and a polarizer protection film such as a triacetyl cellulous film, or the like may be attached onto at least one plane of the polarizer.

As the polarizer protection films attached onto one plane or both planes of the polarizer, an appropriate transparent film may be used. For example, a thermoplastic resin may be used, which is excellent in transparency, a mechanical strength, thermal stability, a moisture barrier property, isotropy, and the like. As the thermoplastic resin, a cellulous resin such as triacetyl cellulose, a polyester resin, a polyether sulfone resin, a poly sulfone resin, a polycarbonate resin, a polyamide resin, a polyimide resin, a polyolefin resin, a (met) acrylic resin, a cyclic polyolefin resin (norbornene-based resin), a polyarylate resin, a polystyrene resin, a polyvinyl alcohol resin, and a mixture thereof may be used. However, the type of thermoplastic resin is just an example for a description and the type of thermoplastic is not limited.

The material and the thickness of the release film are not particularly limited and various films may be used. As the release film, for example, a polyethylene terephthalate (PET) film, a polyethylene (PE) film a polypropylene (PP) film, and the like may be used and the release film may have a thickness of, for example, 12 to 80 µm.

Referring to FIG. 3a, the plurality of sheet pieces 200 is formed by cutting the pre-processing optical film 100 in the width direction of the pre-processing optical film 100. The pre-processing optical film 100 may be provided in a roll type and the roll type pre-processing optical film is released to form the plurality of sheet pieces 200. The post-processing optical film in which the plurality of sheet pieces 200 are connected is used for manufacturing a display unit. In order to manufacture the post-processing optical film, the pre-processing optical film 100 having a width a long-edge length of a panel or more or a pre-processing optical film 100 having a width corresponding to a long edge of the panel may be used. The width of the pre-processing optical film 100, which corresponds to the long edge of the panel may be minutely large or small within the same range or a cutting error range as the length of the long edge of the panel.

The size of the sheet piece 200 cut from the pre-processing optical film 100 may preferably correspond to the size of the panel used to manufacture the display unit. For example, the plurality of sheet pieces 200 corresponding to the size of the panel may be preferably formed by cutting the pre-processing optical film 100 having the width corresponding to the long edge of the panel at an interval of a length corresponding to a short edge of the panel in the width direction of the pre-processing optical film 100. Further, the plurality of sheet pieces 200 may be formed, which is larger than the size of the panel by cutting the pre-processing optical film 100 with, for example, a length corresponding to a short edge of the panel or more.

During a process of cutting the pre-processing optical film 100 in the width direction of the pre-processing optical film 100, the plurality of sheet pieces 200 may be formed by excluding a part having a defect. For example, when the pre-processing optical film 100 granted with a mark indicating the defect of the optical film is used, the plurality of sheet pieces 200 may be formed by determining a cutting position so that the part of the optical film granted with the mark is not included in the sheet piece 200. Therefore, the defect included in the post-processing optical film may be minimized.

The pre-processing optical film 100 may be cut by using, for example, a laser device or a cutter device.

Referring to FIG. 3b, when the plurality of sheet pieces 200 is formed by cutting the pre-processing optical film 100, the plurality of sheet pieces 200 is aligned so that the first end portions parallel to the longitudinal direction of the pre-processing optical film 100 are opposite to each other. The sheet piece 200 formed by cutting the pre-processing optical film 100 has a first end portion parallel to the longitudinal direction of the pre-processing optical film 100 and a second end portion orthogonal to the first end portion.

In the present invention, "opposed" means that the sheet pieces 200 do not overlap with each other by aligning end planes of the sheet pieces 200 at an interval of, for example, 0.1 to 20 mm or with no interval.

The plurality of respective sheet pieces 200 need to be aligned so as not to overlap with each other and the interval between the first end portions of the plurality of respective aligned sheet pieces 200 may be preferably small.

When the first end portions of the plurality of sheet pieces 200 are aligned to be opposite to each other, the plurality of sheet pieces 200 may be preferably aligned so that the respective first end planes are parallel to each other. A measurer capable of measuring a parallel state, a jig or an adsorption means for fixing the sheet piece, and the like may be used so that the first end planes of the sheet pieces 200 are aligned to be accurately parallel to each other. Therefore, the absorption axes formed in the optical members 130 included in the plurality of aligned sheet pieces 200 are parallel to each other.

Referring to FIG. 3b, the elongated post-processing optical film is manufactured, in which the first end portions of the plurality of sheet pieces 200, which are opposite to each other are connected to each other. In order to connect the plurality of sheet pieces 200, for example, a connection member and a thermal fusion iron may be used.

Figure 4A:
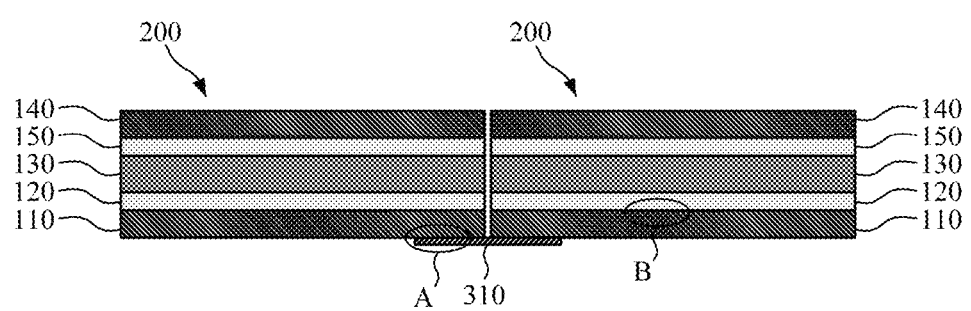
FIGS. 4a and 4b are diagrams illustrating that two adjacent sheet pieces are connected to each other by a connection member according to an exemplary embodiment of the present invention.
Figure 4B:
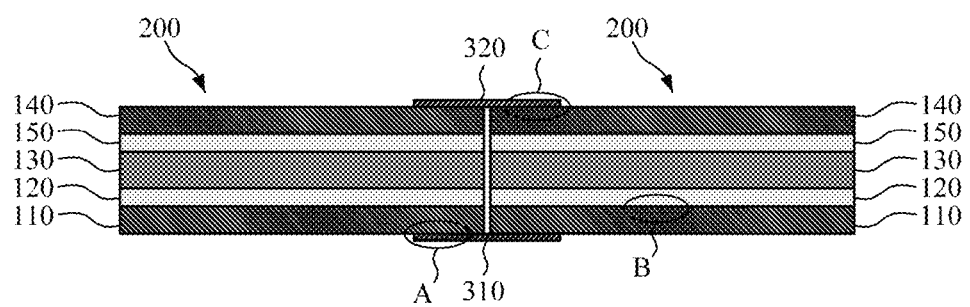

FIGS. 4a and 4b are diagrams illustrating that two adjacent sheet pieces are connected to each other by a connection member according to an exemplary embodiment of the present invention.

In the sheet piece connecting step according to the exemplary embodiment of the present invention, the release films 110 on two adjacent sheet pieces 200 may be connected to each other by using the first connection member 310.

As the connection member 300, an adhesive tape may be used, but the type of connection member 300 is not limited. As the adhesive tape, for example, an adhesive tape in which a pressure sensitive adhesive is immerged in a non-woven fabric or an adhesive tape in which the pressure sensitive adhesive is applied to a material such as polypropylene, or the like may be used. The thickness of the adhesive tape may be preferably in the range of 10 μm to 5 mm and adhesive force of the adhesive tape may be preferably in the range of 1 N/25 mm to 30 N/25 mm.

Further, a process of connecting the plurality of sheet pieces 200 by using the connection member 300 may be manually performed, but the process may be performed by using a device such as an adhesion roll, or the like. As the adhesion roll, for example, a roll in which a roll core is coated with a rubber layer having a thickness of several millimeters or dozens of millimeters may be used.

Further, the plurality of sheet pieces 200 may be connected by using a thermal fusion method. For example, the plurality of sheet pieces 200 may be connected by aligning the sheet pieces 200 so that the first end portions parallel to the longitudinal direction of the pre-processing optical film 100 between the first end portion and the second end portion of the sheet piece 200 orthogonal to each other are opposite to each other, and directly pressing pats of the release films 110 on two adjacent sheet pieces 200 with the thermal fusion iron and thermally fusing the corresponding parts.

According to the exemplary embodiment of the present invention, in the sheet piece connecting step, the release films 110 on two adjacent sheet pieces 200 may be connected to each other by using the first connection member 310 and the surface protection films 140 on two adjacent sheet pieces 200 may be connected by using a second connection member 320.

The process of connecting the release films 110 on two adjacent sheet pieces 200 by using the first connection member 310 and the process of connecting the surface protection films 140 on two adjacent sheet pieces 200 by using the second connection member 320 may be simultaneously or sequentially performed.

According to the exemplary embodiment of the present invention, the direction of the absorption axis formed in the optical member 130 included in the post-processing optical film may be orthogonal to the longitudinal direction of the post-processing optical film. Referring to FIGS. 3a and 3b, the direction of the absorption axis of the pre-processing optical film 100 is parallel to the longitudinal direction of the pre-processing optical film, but the direction of the absorption axis of the post-processing optical film is orthogonal to the longitudinal direction of the post-processing optical film.

That is, by the manufacturing method of an optical film according to the exemplary embodiment of the present invention, it is possible to change the direction of the absorption axis of the optical film with respect to the longitudinal direction of the optical film.

The post-processing optical film manufactured by using the pre-processing optical film 100 may manufacture the display unit by peeling off the release film 110 and attaching the adhesive layer 120 on the panel.

According to the exemplary embodiment of the present invention, when the adhesive force between the first connection member 310 and the release film 110 is represented by A and the adhesive force between the release film 110 and the adhesive layer 120 is represented by B, A may be larger than B.

Referring to FIG. 4a, when the adhesive force A is larger than the adhesive force B, the release film 110 may be consecutively smoothly peeled off from the post-processing optical film. In order to smoothly remove the release film 110 from the post-processing optical film, the adhesive force A is preferably larger than the adhesive force B by 10 or more.

According to the exemplary embodiment of the present invention, when the adhesive force between the first connection member 310 and the release film 110 is represented by A, the adhesive force between the release film 110 and the adhesive layer 120 is represented by B, and the adhesive force between the second connection member 320 and the surface protection film 140 is represented by C, C may be equal to or larger than A and A may be larger than B.

A connection state of the plurality of sheet pieces 200 may be maintained by the second connection member 320 connecting the surface protection film 140 in spite of peeling off the release film 110 from the post-processing optical film.

Referring to FIG. 4b, when the adhesive force C is equal to or larger than the adhesive force A and the adhesive force A is larger than the adhesive force B, the release film 110 may be consecutively and smoothly released from the post-processing optical film and a connection portion may be prevented from being cut off.

Since in the adhesive force A, B, and C, the adhesive force B is determined through a configuration of the pre-processing optical film 100, the adhesive force A and C may be determined by appropriately changing the connection member 300. Further, the adhesive force between the adhesive layer 120 and the optical member 130, the adhesive force between the adhesive 150 and the optical member 130, and the adhesive force between the adhesive 150 and the surface protection film 140 need to be larger than the adhesive force A between the first connection member 310 and the release film 110. In addition, the adhesive force A and the adhesive force C may be preferably 10 times or more larger than the adhesive force B.

Figure 5:
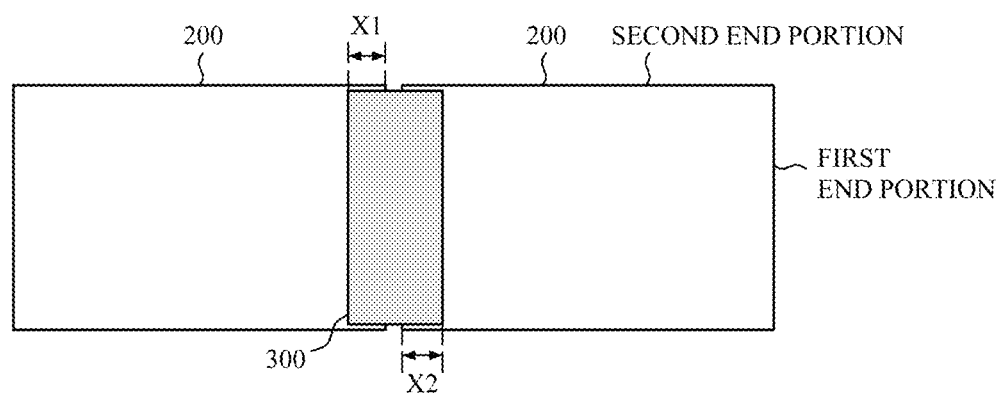
FIG. 5 is a diagram illustrating that the connection member is attached to two adjacent sheet pieces according to an exemplary embodiment of the present invention.

FIG. 5 is a diagram illustrating that the connection member is attached to two adjacent sheet pieces according to an exemplary embodiment of the present invention.

The connection member 300 according to the exemplary embodiment of the present invention may be attached to a first end-direction total length of the sheet piece 200 parallel to the longitudinal direction of the pre-processing optical film 100.

Referring to FIG. 5, the first connection member 310 and the second connection member 320 may be attached to a substantially first end-direction total length of two adjacent sheet pieces 200 which are opposed. Further, as illustrated in FIG. 5, when adhesive distances from the first end portion of the sheet piece 200 up to the end portion of the connection member 300 are X1 and X2, X1 and X2 may be preferably more than 10 mm or more.

According to the exemplary embodiment of the present invention, an attachment velocity of the connection member 300 to the sheet piece 200 may be 2.0 to 8.0 m/min.

A material manufacturing and producing velocity of the optical film may be determined by a velocity to connect the plurality of sheet pieces 200 and a fault may be minimized, which may occur in the sheet piece connecting step by controlling the attachment velocity of the connection member 300 to the sheet piece 200. Further, the attachment velocity of the connection member 300 to the sheet piece 200 may vary depending on the thickness of the connected sheet piece 200. For example, when the plurality of sheet pieces having a thickness of approximately 200 μm is connected to each other, the connection member may be preferably attached to the sheet piece at a velocity of 2.0 to 8.0 m/min. The attachment velocity of the connection member 300 to the sheet piece 200 may be preferable 4.0 to 6.0 m/min so as to prevent an overlapping fault among the plurality of connected sheet pieces 200 and maintain a spaced interval among the sheet pieces 200.

When the connection member 300 is attached to the sheet piece 200, tension is not granted to the sheet piece 200, but predetermined tension is granted to the sheet piece 200 connected while being attached with the connection member 300. In order to control a curl of the sheet piece 200 connected in the sheet piece connecting step and minimize the attachment fault of the connection member 300 to the sheet piece 200, tension of 100 to 150 N/m may be preferably granted to the connected sheet piece 200.

The fault of the post-processing optical film may be caused due to the curl generated from edge portions of the optical member 130 and the surface protection film 140 included in the pre-processing optical film 100. The curl may be generated in the sheet piece 200 formed from the pre-processing optical film 100 according to specifications of a plurality of films included in the pre-processing optical film 100, for example, the polarization film, the retardation film, the luminance enhancement film, and the surface protection film 140 of the optical member 130. Even though the curl is generated in the optical member 130 and the surface protection film 140 of the pre-processing optical film 100, the release film 110 is attached through the adhesive layer 120 to suppress the curl from being generated on the sheet piece 200. However, when force to be bent toward the surface protection film 140, which is possessed by the curl generated in the optical member 130 and the surface protection film 140 is larger than the adhesive force between the adhesive layer 120 and the release film 110, a problem may occur, in which the adhesive layer 120, the optical member 130, and the surface protection film 140 are removed from the release film 110. Therefore, in order to prevent the fault of the post-processing optical film, the pre-processing optical film 100 including the optical member 130 and the surface protection film 140 having predetermined curl in a direction to be opposite to the surface protection film 140 may be preferably used and the pre-processing optical film 100 including the optical member 130 and the surface protection film 140 which are flat may be more preferably used. Further, in order to prevent the adhesive layer 120, the optical member 130, and the surface protection film 140 from being peeled off from the release film 110 by the curl when the post-processing optical film is wound or the post-processing optical film is fed to the process of attaching the post-processing optical film onto the panel, the post-processing optical film may be preferably manufactured by using the pre-processing optical film 100 in which the adhesive force between the adhesive layer 120 and the release film 110 is larger than the bending force of the curl generated in the optical member 130 and the surface protection film 140.

The manufacturing method of an optical film according to the exemplary embodiment of the present invention may further include a winding step of winding the post-processing optical film in the roll type and winding tension applied to the post-processing optical film in the winding step may be 100 to 200 N/m.

The post-processing optical film manufactured to elongate by connecting the plurality of sheet pieces 200 may be wound in the roll type. In order to prevent an inclination phenomenon in which the post-processing optical film is inclined to be pushed in one direction while transporting the roll type post-processing optical film and prevent a phenomenon in which the optical film is pressed by the connection member 300 at the time of winding the post-processing optical film connected by the connection member 300, the post-processing optical film may be wound while applying the winding tension of 100 to 200 N/m. For example, the winding tension applied to the post-processing optical film may be preferably 120 to 180 N/m and more preferably 140 to 160 N/m. However, since the winding tension applied to the post-processing optical film may be controlled according to the thickness of the connection member 300, the thickness of the sheet piece 200, and a faulty condition of the optical film, the winding tension applied to the post-processing optical film is not limited to the aforementioned example.

Figure 6A:
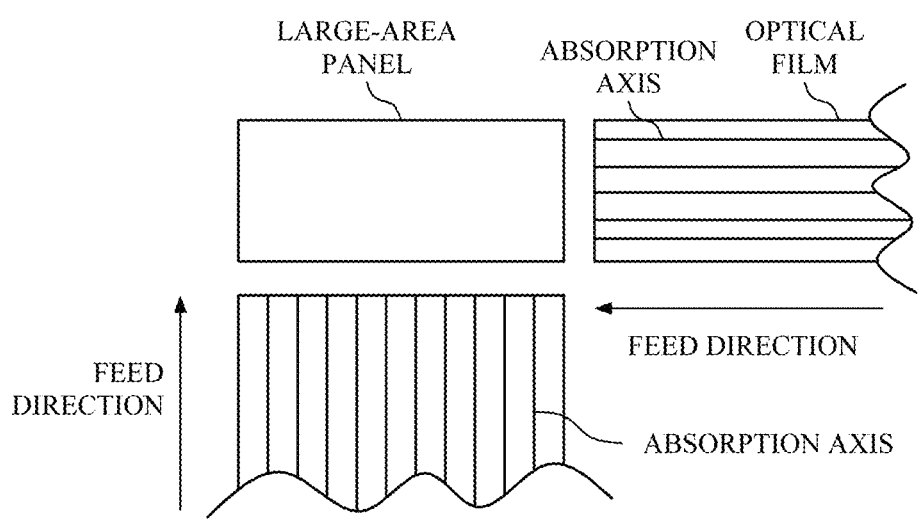
FIG. 6a is a diagram illustrating that the optical film is fed to the panel in the related art and FIG. 6b is a diagram illustrating that the optical film is fed to the panel according to another exemplary embodiment of the present invention.
Figure 6B:
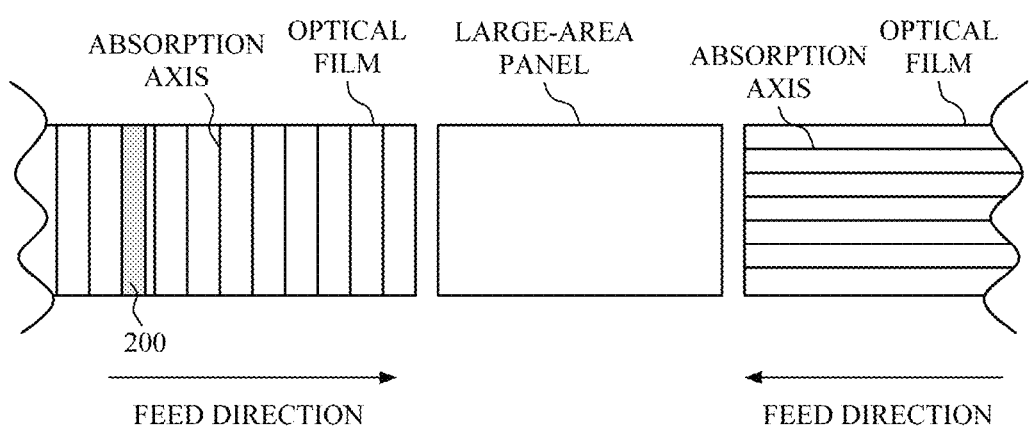

FIG. 6a is a diagram illustrating that the optical film is fed to the panel in the related art and FIG. 6b is a diagram illustrating that the optical film is fed to the panel according to another exemplary embodiment of the present invention.

According to another exemplary embodiment of the present invention, as an optical film which the plurality of sheet pieces 200 formed by cutting the pre-processing optical film 100 in which the release film 110, the adhesive layer 120, the optical member 130, and the surface protection film 140 are sequentially stacked in a width direction of the pre-processing optical film 100 is connected, an optical film is provided, in which the plurality of sheet pieces 200 is aligned so that first end portions parallel to the longitudinal direction of the pre-processing optical film 100 between the first end portions and the second end portions of the sheet piece 200, which are orthogonal to each other are opposite to each other and the first end portions of the plurality of sheet pieces 200, which are opposite to each other are connected. The direction of the absorption axis formed in the optical member 130 included in the optical film may be orthogonal to the longitudinal direction of the optical film.

When the optical film according to another exemplary embodiment of the present invention is used, it is possible to easily manufacture a display unit using a large-area panel.

In order to manufacture the display unit, for example, the optical film having the width corresponding to the long edge of the panel may be attached onto one plane of the panel and the optical film having the width corresponding to the short edge of the panel may be attached onto the other plane of the panel. The optical film is attached onto the panel in a feed direction (the longitudinal direction of the optical film) of the optical film and the absorption axes of the optical films attached onto one plane and the other plane of the panel are orthogonal to each other.

In order to manufacture the display unit having the size of a screen, for example, 98 inches or more, a panel (hereinafter, referred to as a large-area panel) corresponding to the size of the display unit is used. Referring to FIG. 6a, the display unit may be manufactured by attaching the optical film having the width corresponding to the short edge of the large-area panel onto one plane of the large-area panel and attaching the optical film having the width corresponding to the long edge of the panel onto the other plane of the large-area panel. As illustrated in FIG. 6a, when the optical film having the width corresponding to the long edge of the large-area panel is attached onto the large-area panel in the longitudinal direction of the short edge of the large-area panel, a phenomenon may occur, in which as the width of a roller feeding the optical film and the width of an attachment roller attaching the optical film onto the large-area panel increase, the feeding roller and the attachment roller droop down. As a result, when the optical film is attached onto the large-area panel, attachment precision of the optical film onto the panel significantly deteriorates and a failure factor occurs between attachment planes of the optical film and the panel, and as a result, the quality of the display unit may deteriorate.

On the contrary, the absorption axis of the optical film according to another exemplary embodiment of the present invention is orthogonal to the longitudinal direction of the optical film. Referring to FIG. 6b, since the optical film having the absorption axis orthogonal to the longitudinal direction of the optical film has the width corresponding to the short edge of the panel, the optical film may be fed and attached in the longitudinal direction of the long edge of the large-area panel. Accordingly, the optical film according to another exemplary embodiment of the present invention may be easily fed and attached onto the panel and a problem may be prevented, which occurs when the optical film having the width corresponding to the long edge of the panel is used.

The plurality of sheet pieces 200 may be connected to each other by using, for example, the connection member and the thermal fusion iron. However, the method that connects the plurality of sheet pieces 200 is not limited.

In the optical film according to another exemplary embodiment of the present invention, the release films 110 on two adjacent sheet pieces 200 may be connected to each other by using the first connection member 310.

As the connection member 300, the adhesive tape may be used, but the type of connection member is not limited. Since the optical film may be stored and kept while being wound in the roll type, the adhesive tape having the thickness of 10 μm to 5 mm may be preferably used in order to prevent the defect from occurring in the optical film due to the thickness of the connection member 300 during winding.

The size of the sheet piece 200 cut from the pre-processing optical film 100 may preferably correspond to the size of the panel used to manufacture the display unit. Referring to FIG. 4a, the elongated optical film in which the plurality of sheet pieces 200 having the size corresponding to the size of the panel is formed to be connected by the first connection member 310 may have a form in which the adjacent sheet pieces 200 on the optical film are spaced apart from each other at a predetermined interval. When the display unit is manufactured by using the optical film in the related art, for example, the roll-type optical film is released and the release film is not cut according to the size of the panel but cut (hereinafter, referred to as half-cut) up to the surface protection film, the optical film, and the adhesive layer and the cut optical film is removed from the release film and attached onto the panel. Accordingly, in the case of the optical film according to another exemplary embodiment of the present invention, since the plurality of sheet pieces 200 corresponding to the size of the panel may be connected to each other while being spaced apart from each other at a predetermined interval, a process of half-cutting the optical film when manufacturing the display unit by using the optical film in the related art may be skipped.

Further, the optical film formed by connecting the plurality of sheet pieces 200 larger than the panel may be half-cut and attached onto the panel when manufacturing the display unit.

According to another exemplary embodiment of the present invention, when the adhesive force between the first connection member 310 and the release film 110 is represented by A and the adhesive force between the release film 110 and the adhesive layer 120 is represented by B, A may be larger than B. In addition, the adhesive force A may be preferably 10 times or more larger than the adhesive force B.

In the optical film according to another exemplary embodiment of the present invention, the release films 110 on two adjacent sheet pieces 200 may be connected to each other by using the first connection member 310 and the surface protection films 140 on two adjacent sheet pieces 200 may be connected to each other by using the second connection member 320.

For example, the elongated optical film may be formed, in which the plurality of sheet pieces larger than the panel are connected to each other by the first and second connection members. Referring to FIG. 4b, when the display unit is manufactured by using the optical film, the plurality of sheet pieces may be half-cut with a portion to which the second connection member is attached, interposed therebetween. In order to prevent the portions of the optical films to which the second connection member is attached, which is partitioned by half-cut from being attached onto the panel, the portions may be excluded during a process of manufacturing the display unit.

According to another exemplary embodiment of the present invention, when the adhesive force between the first connection member 310 and the release film 110 is represented by A, the adhesive force between the release film 110 and the adhesive layer 120 is represented by B, and the adhesive force between the second connection member 320 and the surface protection film 140 is represented by C, C may be equal to or larger than A and A may be larger than B. In addition, the adhesive force A and the adhesive force C may be preferably 10 times or more larger than the adhesive force B.

When the relationship is formed among the adhesive force A, B, and C, the connection state of the plurality of sheet pieces 200 may be excellently maintained even when the optical film is wound and moves. Further, even though the release film 110 is removed from the optical film while manufacturing the display unit, the films constituting the optical film may be prevented from being separated from each other.

The connection member 300 according to another exemplary embodiment of the present invention may be attached to the first end-direction total length of the sheet piece 200 parallel to the longitudinal direction of the pre-processing optical film 100.

The aforementioned description of the present invention is to be exemplified, and it can be understood by those skilled in the art that the technical spirit or required features of the present invention can be easily modified in other detailed forms without changing the technical spirit or requisite features of the present invention. Therefore, it should be appreciated that the aforementioned exemplary embodiments are illustrative in all aspects and are not restricted. For example, respective constituent elements described as single types can be distributed and implemented, and similarly, constituent elements described to be distributed can also be implemented in a coupled form.

The scope of the present invention is represented by claims to be described below rather than the detailed description, and it is to be interpreted that the meaning and scope of the claims and all the changes or modified forms derived from the equivalents thereof come within the scope of the present invention.

The invention claimed is:

1. A method for manufacturing an optical film, comprising:
   forming a plurality of sheet pieces by cutting a pre-processing optical film in which a release film, an adhesive layer, an optical member, and a surface protection film are sequentially stacked in a width direction of the pre-processing optical film;
   aligning the plurality of sheet pieces in such a manner that first end portions parallel to a longitudinal direction of the pre-processing optical film are opposite to each other, wherein each of the sheet pieces has a first end portion and a second end portion, which are orthogonal to each other; and
   connecting the first end portions of the plurality of sheet pieces, which are opposite to each other, by attaching a first connection member,
   wherein, when an adhesive force between the first connection member and the release film of each sheet piece is represented by A, and an adhesive force between the release film of each sheet piece and the adhesive layer is represented by B, A is larger than B,
   wherein an elongated post-processing optical film is manufactured.

2. The method of claim 1, wherein a direction of an absorption axis formed in the optical member included in the post-processing optical film is orthogonal to a longitudinal direction of the post-processing optical film.

3. A method for manufacturing an optical film, comprising:
   forming a plurality of sheet pieces by cutting a pre-processing optical film in which a release film, an adhesive layer, an optical member, and a surface protection film are sequentially stacked in a width direction of the pre-processing optical film;
   aligning the plurality of sheet pieces in such a manner that first end portions parallel to a longitudinal direction of the pre-processing optical film are opposite to each other, wherein each of the sheet pieces has a first end portion and a second end portion, which are orthogonal to each other; and
   connecting the first end portions of the plurality of sheet pieces, which are opposite to each other,
   wherein in the connecting, each release film on two adjacent sheet pieces are connected to each other by using a first connection member, and the surface protection film on each of two adjacent sheet pieces are connected to each other by using a second connection member,
   wherein an elongated post-processing optical film is manufactured.

4. The method of claim 3, wherein, when an adhesive force between the first connection member and the release film of each of the two adjacent sheet pieces is represented by A, an adhesive force between the release film of each of the two adjacent sheet pieces and the adhesive layer is represented by B, and an adhesive force between the second connection member and the surface protection film of each of the two adjacent sheet pieces is represented by C, C is equal to or larger than A, and A is larger than B.

5. The method of claim 1, wherein the first connection member is attached to the first end portions of the plurality of sheet pieces parallel to the longitudinal direction of the pre-processing optical film.

6. The method of claim 1, wherein an attachment velocity of attaching the connection member to the sheet piece is 2.0 to 8.0 m/min.

7. The method of claim 1, further comprising:
   winding the post-processing optical film into a roll,
   wherein in the winding, a winding tension applied to the post-processing optical film is in a range of 100 to 200 N/m.

8. The method of claim 1, wherein the first connection member is an adhesive tape.

9. The method of claim 3, wherein each of the first connection member and the second connection member is an adhesive tape.

* * * * *